A. H. HAUSER.
WATER STOP.
APPLICATION FILED SEPT. 19, 1919.
1,348,562. Patented Aug. 3, 1920.
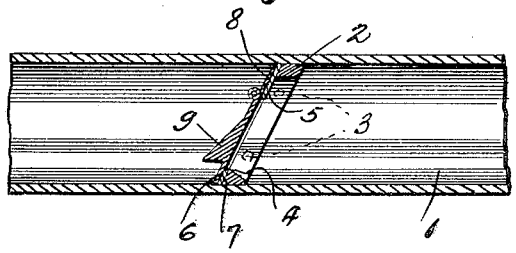
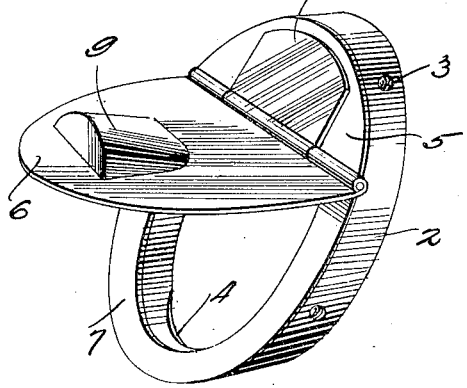
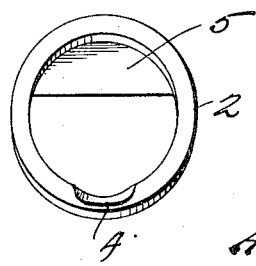
WITNESSES
G. W. Walling
U. B. Hillyard.
Inventor
Albert H. Hauser
By Richard B. Owen,
Attorney

UNITED STATES PATENT OFFICE.

ALBERT H. HAUSER, OF COLUMBUS, OHIO.

WATER-STOP.

1,348,562.　　　　Specification of Letters Patent.　　Patented Aug. 3, 1920.

Application filed September 19, 1919. Serial No. 324,768.

*To all whom it may concern:*

Be it known that I, ALBERT H. HAUSER, a citizen of the United States, residing at Columbus, in the county of Franklin and State of Ohio, have invented certain new and useful Improvements in Water-Stops, of which the following is a specification.

This invention relates to check valves or water stops for controlling the flow of water through a pipe or like conduit, being particularly designed for drain and sewer pipes.

The invention has for its primary object to provide a device for the purpose aforesaid which is comparatively simple in its formation and effective in service and which is automatic in operation, so as not to obstruct the flow of water in one direction but which effectively prevents a reverse flow in the event of back pressure.

The invention provides a check valve, or water stop, embodying a minimum number of parts and which is free from the use of springs and which automatically maintains a close joint, thereby preventing back flow, but which opens readily to admit of the outflow of water or sewerage in the direction of escape.

The drawing illustrates a preferred embodiment of the invention. However, it is to be understood that in adapting the same to meet different conditions, various changes in the form, proportion, and minor details of construction may be resorted to without departing from the nature of the invention as claimed hereinafter.

Figure 1 is a central section of a length of drain tile or sewer pipe provided with a check valve or water stop embodying the invention.

Fig. 2 is a perspective view of the valve or stop showing the gate in open position, and Fig. 3 is a rear view of the valve or stop showing the parts on a smaller scale than Fig. 2, and slightly larger than Fig. 1.

Corresponding and like parts are referred to in the following description and indicated in the several views of the drawing by like reference characters.

The numeral 1 designates a length of tile, sewer pipe, or other conduit with which the valve or stop is adapted to be associated when in operative position.

The valve, or stop, comprises a ring 2 which is adapted to be snugly fitted within the pipe, or conduit 1 and secured therein by suitable fastenings 3 which are adapted to be passed through the pipe 1 and engage the ring 2. The ring 2 when in position occupies a diagonal or oblique position, as indicated, clearly in Fig. 1, the purpose being to utilize gravitative action to the best possible advantage in maintaining the gate in closed position without requiring the employment of spring means for said purpose. The ring 2 constitutes in effect a section of a tube cut diagonally so that when the ring is in position, its outer surface snugly fits against the inner wall of pipe 1. A portion is cut away from the inner wall of the ring 2, as indicated at 4, the purpose being to provide clearance and prevent the accumulation of material against the lower portion of the ring when the device is placed in position. When in service the ring 2 occupies a position with the cut-away part 4 at the lowest point.

A plate 5 is secured against a side of the ring 2 at a point diametrically opposite the cut-away portion 4. The gate 6 is hinged to the lower edge of the plate 5 in such a manner as to maintain a close joint therewith. The gate 6 closes against the face of the ring 2 to which the plate 5 is attached. A packing 7 is secured to the ring 2 so as to come between the ring and the gate 6 and insure a close joint being maintained when the gate is closed. A leaf 8 is secured to the plate 5 and the gate 6 is hinged directly thereto. A weight 9 is provided upon the lower portion of the gate 6 and serves as means to hold the gate in closed position.

The valve or stop constructed in the manner herein disclosed is adapted to be placed in a pipe or conduit 1 so as to occupy a relatively inclined position, the cut-away portion 4 of the ring being at the lowest point and the valve arranged so that the gate 6 is held seated by the joint action of its weight and the weight 9. The gate 6 is adapted to open upwardly by a swinging movement to admit of water flowing through the pipe or conduit 1, such flow being in the direction from right to left of Fig. 1. When the flow ceases, the gate closes and in the event of any back pressure the gate remains closed thereby preventing flooding of the part from which the pipe or conduit 1 leads.

The foregoing description and the drawings have reference to what may be considered the preferred, or approved, form of my invention. It is to be understood that I may make such changes in construction and arrangement and combination of parts, materials, dimensions, et cetera, as may prove expedient and fall withing the scope of the appended claim.

Having thus described my invention what I claim as new and desire to secure by Letters Patent is:—

The herein described valve or stop for conduits, the same comprising a ring approximating a diagonal section of a tube and having a portion removed from its inner side and adapted to occupy the lowest point, a plate secured to a side of the upper portion of the ring diagonally opposite the cutaway portion thereof, and a leaf secured to the plate, a gate hinged to the leaf and adapted to close against a side of the ring, and a weight on the outer side of the gate.

In testimony whereof I affix my signature in presence of two witnesses.

ALBERT H. HAUSER.

Witnesses:
PAUL D. MEEK,
J. H. PENDER.